Patented July 26, 1927.

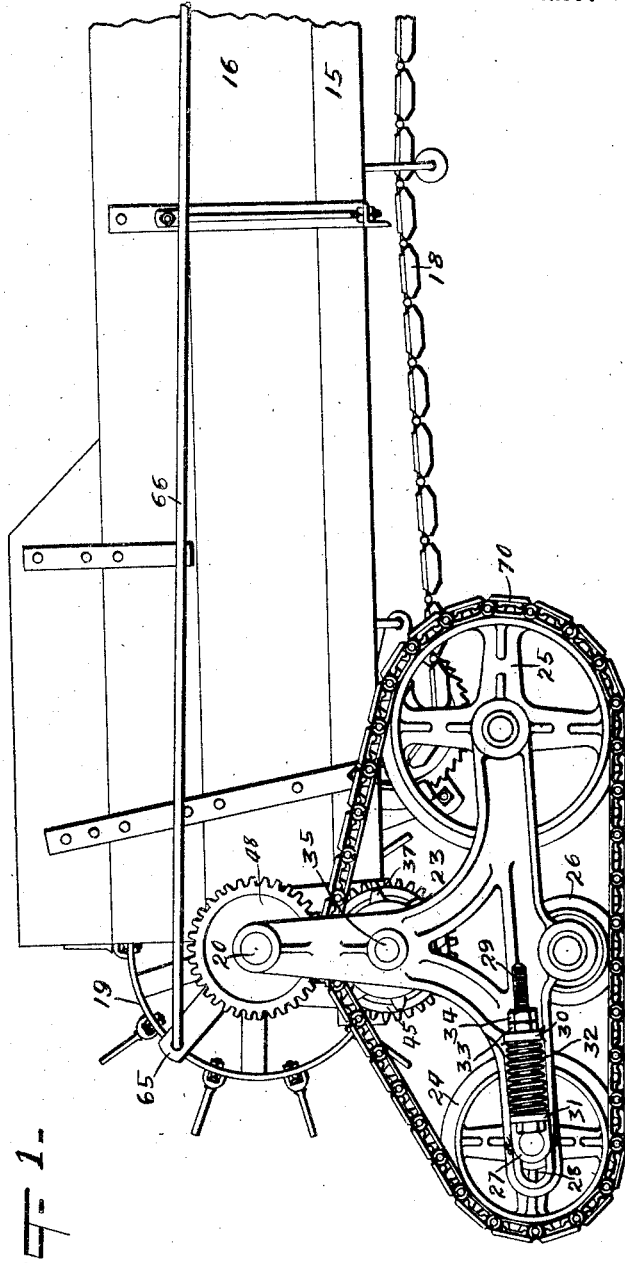

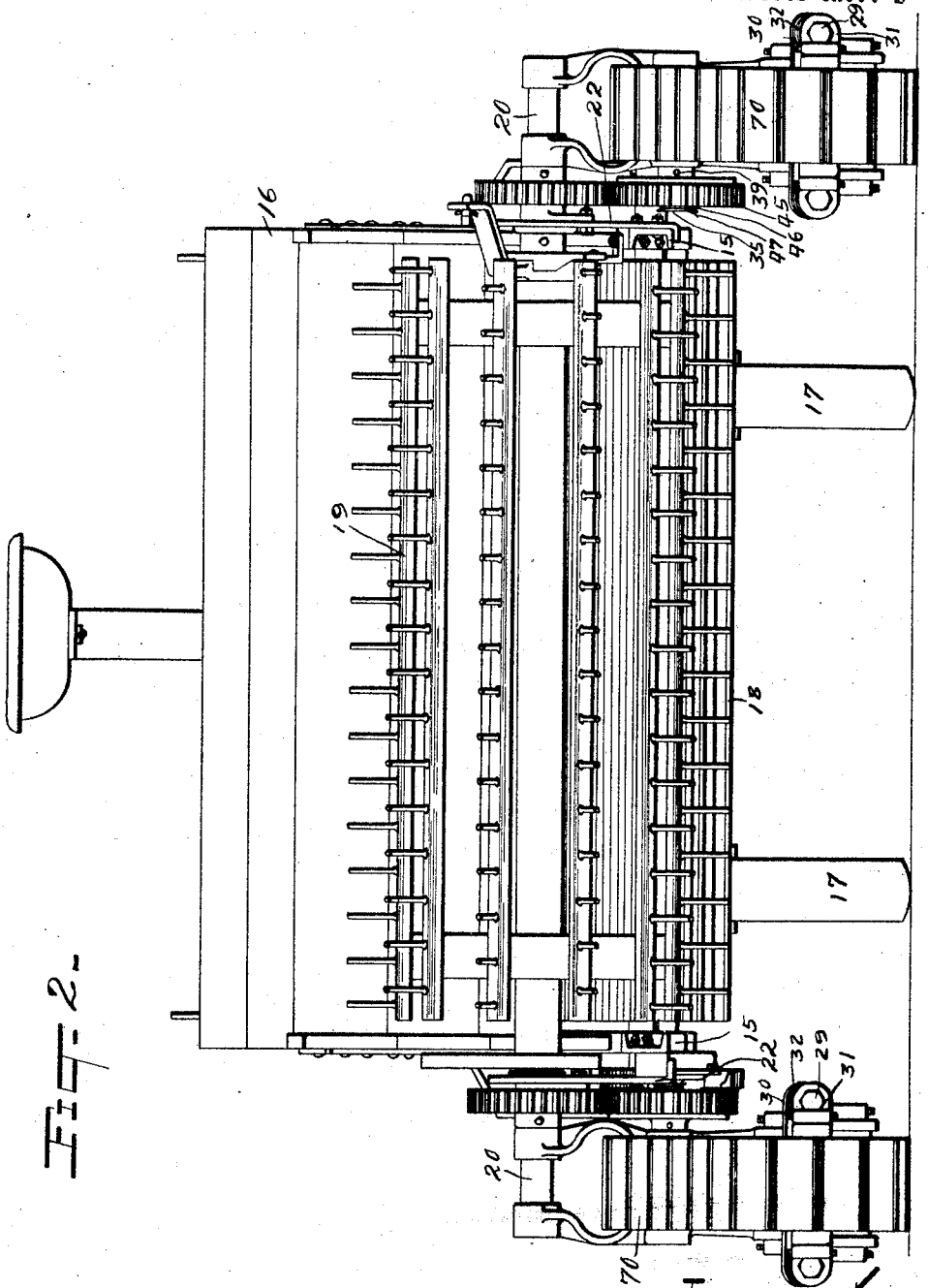

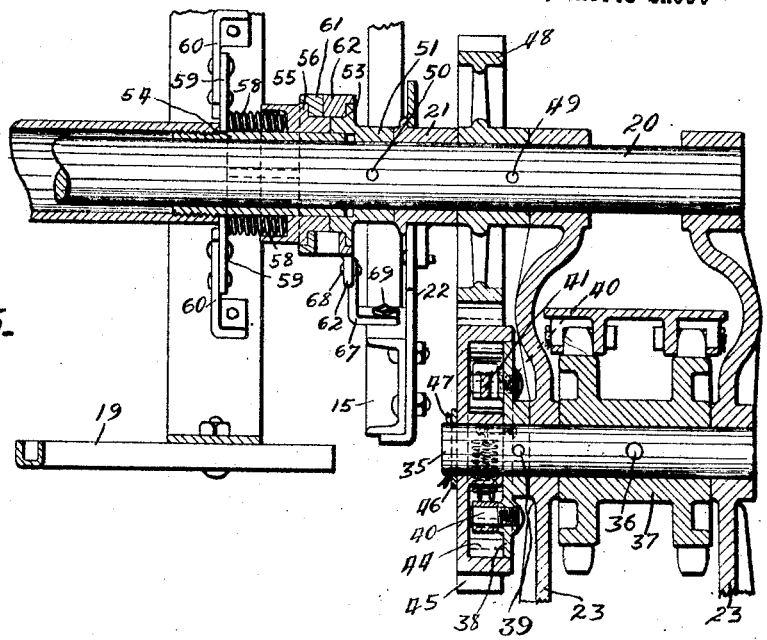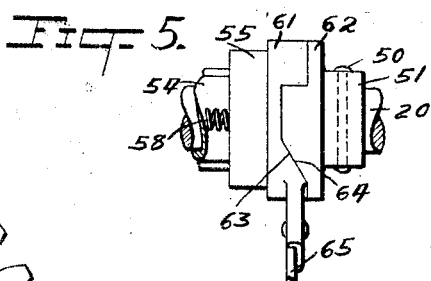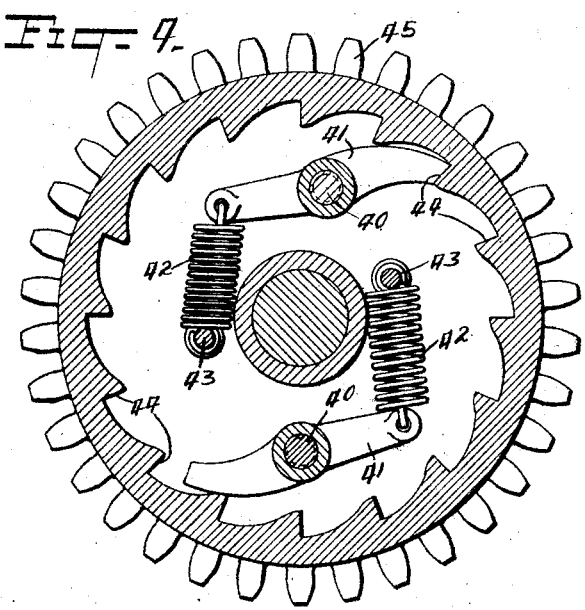

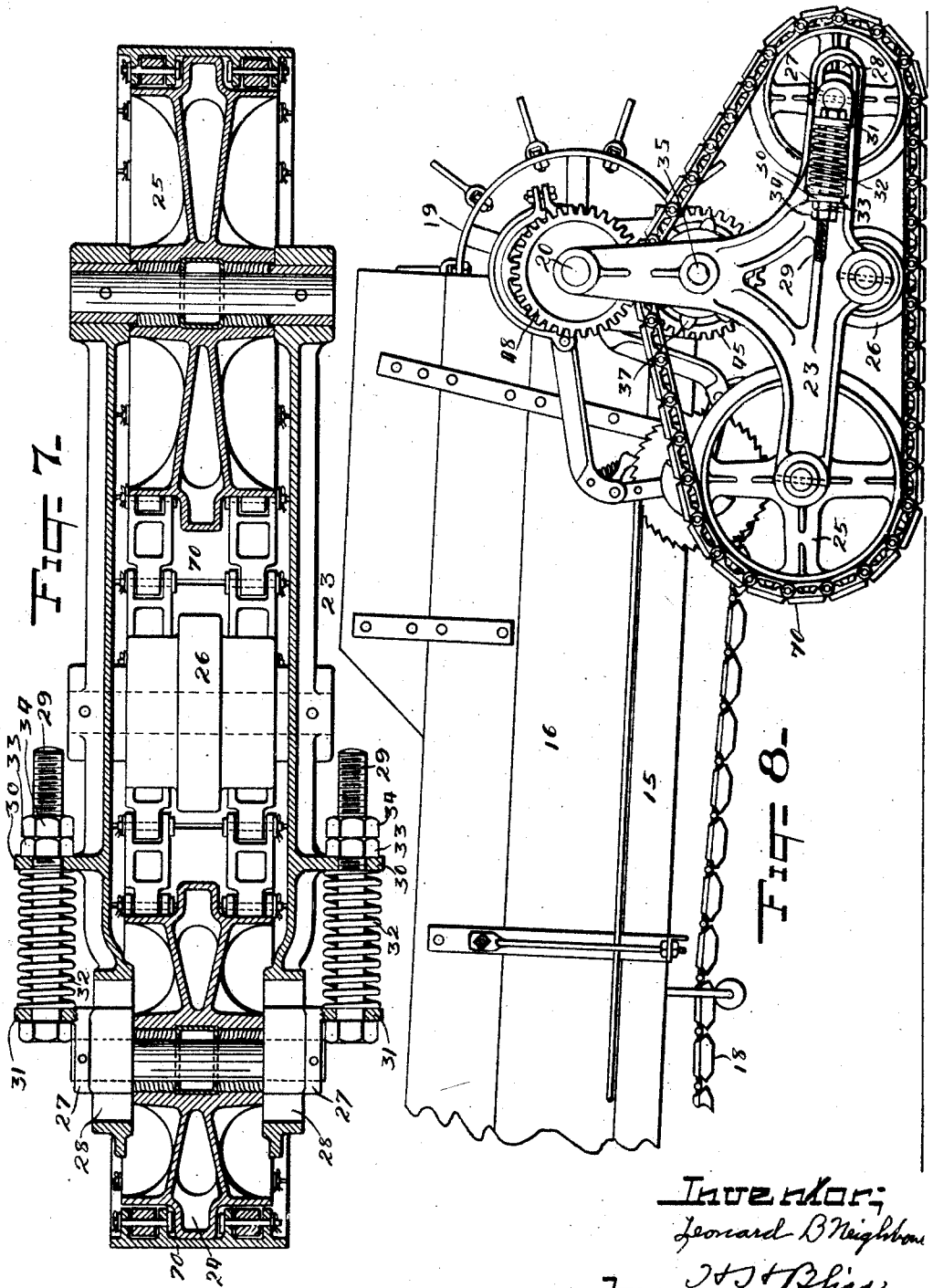

1,636,828

UNITED STATES PATENT OFFICE.

LEONARD B. NEIGHBOUR, OF EAST MOLINE, ILLINOIS, ASSIGNOR TO DEERE & COMPANY, OF MOLINE, ILLINOIS, A CORPORATION OF ILLINOIS.

TRACTION MOTOR.

Application filed September 10, 1921. Serial No. 499,866.

This invention relates to improvements in portable machines which comprise relatively movable driven parts that require constant application of high power, which power is generally derived from traction wheels actuated by the ground surface as they, under draft from other devices, roll along such surface. The purpose is to provide a traction power mechanism of greater efficiency and which will be more constant in its work than has been the case with circular traction wheels heretofore used in such machines.

I have selected for illustration and description a manure spreader as typical of the various mechanisms in which my improvements can be used, such a spreader comprising a vehicle frame, devices for propelling it, and two or more sets of driven parts on the frame frequently requiring high power.

Referring to the drawings in which like numerals indicate identical parts—

Figure 1 is a side elevation of a manure spreader with my improved traction means attached.

Figure 2 is a rear view of the spreader shown in Fig. 1.

Figure 3 is a sectional detail view showing the preferred method of mounting the traction member frame on the beater shaft and the means for operating the beater.

Figure 4 is a sectional view on line $a$—$a$ of Fig. 3.

Figure 5 is a detail view of the clutch throw-out means.

Figure 6 is a detail view of the clutch with the throw-out means removed.

Figure 7 is a section on the plane of the axes of the shafts or axles of the chain guiding wheels.

Figure 8 is a side elevation of part of the vehicle body and of the mechanism on the side opposite to that shown in Fig. 1.

15 is the usual frame of the spreader upon which is mounted a fertilizer box or body 16 and which is supported at the front end in the usual manner by wheels 17. The box 16 is supplied with a movable bottom or apron 18 which when operated, in any well known manner, carries the fertilizer contained in the box 16 to a beater 19 rotatably mounted on a shaft 20 at the rear of the box 16. The shaft 20 is of sufficient length to extend beyond the sides of the box 16 at either end, and is mounted in bearings 21 supported by brackets 22 secured to the frame 15.

Pivotally mounted on each end of the shaft 20 are two triangular shaped frames 23 between which are positioned flanged wheels 24, 25 and 26 respectively, mounted on shafts $24^a$, $25^a$ and $26^a$. The bearings 27 for the shaft $24^a$ are mounted adjustably in slots 28 in the frame 23. They are adjusted by means of bolts 29 which extend through lugs 30 integral with the frame and lugs 31 integral with the bearing. Interposed between the lugs 30 and 31 and surrounding the bolt 29 is an expansion spring 32. The bolt 29 is held in adjusted position by means of a nut 33 and a jam nut 34.

Rotatably mounted in the upper arm of each frame 23 and a suitable distance below the shaft 20 is a countershaft 35. Between the frame members 23 at each end of the shaft 20, and held from independent rotation by means of a key (not shown) and a pin 36, is a double sprocket 37 mounted on the shaft 35. The inner end of the shaft 35 extends beyond the inner frame member 23 and has mounted thereon a plate member 38 held from independent rotation by means of a pin 39. 40 are studs secured to the plate 38 and upon which are pivotally mounted dogs 41 held in operating position by means of springs 42 each attached at one end to a dog 41 and at the other end to a stud 43 secured to the plate 38. The dogs 41 are adapted to engage ratchet teeth 44 integral with a gear 45 which is rotatably mounted on the shaft 35 and held in position thereon by means of a washer 46 and a pin 47.

Meshing with the teeth of the gear 45 is a gear 48 mounted on the shaft 20 and secured thereto by a pin 49. Adjacent the bearing 21 and secured to the shaft 20 by means of a pin 50 is a clutch member 51 having ratchet teeth 52 and a flange 53 integral therewith. Secured to a sleeve 54 rotatably mounted on the shaft 20 is a clutch member 55 having integral therewith a flange 56 and ratchet teeth 57 adapted to engage the teeth 52 of the clutch member 51 and held in engagement therewith by means of springs 58 interposed between the clutch member 55 and a spider 59 attached at its inner end to the sleeve 54 and at its outer end to the beater 19 by means of the connecting bars 60.

Between the clutch members 51 and 55 and held from longitudinal movement by the flanges 55 and 56 are clutch release members 61 and 62 having on one side cam surfaces 63 and 64 adapted when in working position to mesh with each other to allow the teeth 52 and 57 of the clutch members to engage. The clutch release member 61 is held from rotating by means of a lever 65 to which is attached a rod 66 which extends to the forward end of the spreader where it is attached to a lever (not shown) within convenient reach of the operator. The throw-out member 62 is held from rotating by means of a bar 67 attached at one end to the member 62 by a rivet 68 and at the other end to the frame 15 by a bolt 69. It thus will be evident that by operating the lever 65 by means of the rod 66 the member 61 will be rotated and by reason of the cam faces 63 and 64 the clutch members 51 and 55 will be forced apart and the teeth 52 and 57 will be disengaged and motion imparted to the shaft 20 will not be transmitted to the beater 19 through the sleeve 54 and the spiders as is the case when the teeth of the clutch members are in engagement.

Engaging with the ground and around the peripheries of the wheels 24, 25 and 26 and the sprocket wheel 37 is an endless chain, tread, or track 70 having on its inner side recesses adapted to engage the teeth of the sprocket 37; and when the spreader is drawn over the ground it will impart motion to the sprocket 37 and through it to the shaft 35 which in turn will operate the shaft 20 by means of the ratchet 41, the gear 45 and the gear 48.

It will be evident that the ratchet and dog devices will form a differential mechanism between the two driving members of the spreader and will allow the spreader to be freely turned in either direction without causing undue strain on the driving parts and will also permit the spreader to be backed without operating the beater in the reverse direction.

Each chain or endless tread engages with the ground along an approximately horizontal line extended sufficiently to secure high traction and to insure a constant transmission of high power, and to maintain the driven parts on the frame in uniform action, they being liable to experience wide variations in the load to which they are subjected.

The ground contacting part of each chain can have a vibratory movement relatively to the vehicle frame or body without varying its transmission of power. It follows the undulating ground surface irrespective of the position of the vehicle frame and being elongated, will, under all ordinary circumstances, insure a traction grip at numerous points.

To attain this object, the chain or endless tread is mounted so as to be bodily movable. The frame which immediately carries it is adapted to swing in a vertical plane because of its hinge connection with the main vehicle frame or body. And as the hinge axis is the axis about which the countershaft 35 swings, transmission of power from the tread is not interrupted during its swinging movement.

The two chains are so disposed that they can move thus bodily independently of each other to conform to variations in the ground surface along the sides of the machine, and as the axis about which the frames 23 swing is located between the transverse vertical planes of the axes of the wheels 24, 25, the lower course of each of the chains always has extended engagement with the ground so that there is no danger of slippage.

While I have, as above, specifically described a manure spreading mechanism and my improved devices as combined therewith, I do not mean to be understood as limiting their use to such machines. They can be employed upon portable mechanisms of any of numerous forms which are drawn or propelled over, and while resting upon, the ground surface (in contradistinction from resting upon and being guided by track rails) and which carry working parts requiring motive power to actuate them relatively to the carrying frame.

What I claim is:

1. The combination with a vehicle frame and a rotary driven element mounted thereon, of means for driving said driven element comprising an endless chain having an elongated substantially straight portion engaging with the ground, front and rear wheels around which said chain travels, a frame in which said wheels are mounted and by which the weight of one end portion of the vehicle is sustained, said frame being pivoted to swing relatively to the vehicle frame about a transverse axis coincident with the axis of said driven element meanwhile maintaining the ground engaging portion of the chain in contact with the ground, and means mounted on and swinging with said pivoted frame and arranged to be engaged and driven by said chain, said means being operatively connected with said driven element for rotating the same.

2. The combination with a vehicle frame and a rotary driven element mounted thereon, of means for driving said driven element comprising an endless chain having an elongated substantially straight portion engaging with the ground, front and rear wheels around which said chain travels, a frame in which said wheels are mounted and by which the weight of one end portion of the vehicle is sustained, said frame being pivoted to swing relatively to the vehicle frame about a transverse axis coincident with the axis of said driven element meanwhile maintaining the ground engaging portion of the chain in contact with the ground, a sprocket wheel mounted on and swinging with said pivoted frame and supporting the upper course of said chain, and means actuated by said sprocket wheel for rotating said driven element.

3. The combination with a vehicle frame, a rotary driven element mounted thereon and a gear rotating with said driven element, of means for driving said driven element comprising an endless chain having an elongated substantially straight portion constantly engaging with the ground, front and rear wheels supporting said chain, a frame pivoted to swing relatively to the vehicle frame about the axis of said driven element and supporting said wheels and the weight of one end portion of the vehicle, a sprocket wheel mounted on said pivoted frame to swing therewith and arranged to support and be driven by the upper course of said chain, and a gear connected with said sprocket wheel and meshing with said first-mentioned gear.

4. The combination with a vehicle frame, a rotary driven element mounted thereon and a gear rotating with said driven element, of means for driving said driven element comprising an endless chain having an elongated substantially straight portion constantly engaging with the ground, front and rear wheels supporting said chain, a frame pivoted to swing relatively to the vehicle frame about the axis of said driven element and supporting said wheels and the weight of one end portion of the vehicle, a sprocket wheel mounted on said pivoted frame to swing therewith and arranged to support and be driven by the upper course of said chain, and a gear having a pawl and ratchet connection with said sprocket wheel and meshing with said first-mentioned gear.

5. The combination with a vehicle frame, a rotary driven element mounted on said frame, a gear mounted on said frame co-axially with said driven element, and means for operatively connecting said gear with said driven element, of means for driving said driven element comprising an endless chain having an elongated substantially straight portion constantly engaging with the ground, front and rear wheels around which said chain travels, a frame in which said wheels are mounted and by which the weight of one end portion of the vehicle is sustained, said frame being pivoted to swing relatively to the vehicle frame about a transverse axis, and means mounted on said pivoted frame to swing therewith and arranged to be engaged and driven by said chain, said means being operatively connected with said gear.

6. The combination with a vehicle frame and a rotary driven element mounted thereon, of an endless chain having an elongated substantially straight portion constantly engaging with the ground, front and rear wheels supporting said chain, a frame in which said wheels are mounted and by which the weight of one end portion of the vehicle is sustained, said frame being pivotally suspended co-axially with said driven element at a point lying between the transverse vertical planes of the axes of said wheels, and a sprocket wheel mounted on the latter frame to swing therewith and driven by said chain, said sprocket wheel being operatively connected with said driven element.

7. The combination with a vehicle frame and a rotary driven element mounted thereon, of an endless chain having an elongated substantially straight portion constantly engaging with the ground, front and rear wheels supporting said chain, a frame in which said wheels are mounted and by which the weight of one end portion of the vehicle is sustained, said frame being pivotally suspended co-axially with said driven element at a point lying between the transverse vertical planes of the axes of said wheels, a sprocket wheel mounted on the latter frame to swing therewith and being arranged to support and be driven by the upper course of said chain, and means operatively connecting said sprocket wheel with said driven element.

8. The combination with a vehicle frame and a rotary driven element mounted thereon, of an endless chain having an elongated substantially straight portion constantly engaging with the ground, front and rear wheels supporting said chain, a frame in which said wheels are mounted and by which the weight of one end portion of the vehicle is sustained, said frame being pivotally suspended co-axially with said driven element at a point lying between the transverse vertical planes of the axes of said wheels, a sprocket wheel mounted on the latter frame to swing therewith and being arranged to support and be driven by the upper course of said chain, a gear co-axial with said sprocket wheel and driven thereby, and a gear co-axial with said driven element and meshing with said first-mentioned gear.

9. The combination with a vehicle frame and a rotary driven element mounted thereon, of means for driving said driven element comprising a frame suspended to swing about the axis of said driven element and sustaining the weight of the vehicle, wheels mounted in said frame in front of and back of said axis respectively, an endless chain supported by said wheels and having an elongated substantially straight portion constantly engaging with the ground, a sprocket wheel mounted on the latter frame below the axis thereof and arranged to support and be driven by the upper course of said chain, and means actuated by said sprocket wheel for driving said driven element.

10. The combination with a vehicle frame and a rotary driven element mounted thereon, means for driving said driven element comprising endless chains disposed at opposite sides of the vehicle and having elongated substantially straight portions constantly engaging with the ground, pairs of front and rear wheels supporting said chains, frames at opposite sides of and sustaining the weight of the vehicle, said frames being pivoted to swing independently of each other about the axis of said driven element and supporting said pairs of wheels, sprocket wheels mounted on the latter frames to swing therewith, said sprocket wheels supporting the upper courses of their respective chains and being driven thereby, and devices having pawl and ratchet connection with said sprocket wheels, respectively, and operatively connected with said driven element for driving the same.

11. The combination with a load-carrying body, a rotary driven element mounted thereon, and a power transmitter connected with and rotating said driven element, of means for supporting the weight of the rear portion of the body and driving the power transmitter comprising a traction driven endless tread chain having a ground-contacting tread section elongated longitudinally of the body, a support for said chain pivoted to swing about an axis disposed transversely of the body, and means for operatively connecting said chain with said transmitter.

12. The combination with a load-carrying body, a rotary driven element mounted thereon, and a power transmitter connected with and rotating said driven element, of means for supporting the weight of the rear portion of the body and for driving the power transmitter, comprising two traction driven endless tread chains positioned respectively at opposite sides of the body, each having a ground-contacting tread section elongated longitudinally of the body, means for supporting said tread chains arranged to oscillate about a transverse axis independently of each other relatively to the body, and means operable to drive said transmitter from either of said chains independently of the other.

In testimony whereof I affix my signature.

LEONARD B. NEIGHBOUR.